United States Patent
Mital et al.

(10) Patent No.: US 11,609,942 B2
(45) Date of Patent: Mar. 21, 2023

(54) EXPANDING SEARCH ENGINE CAPABILITIES USING AI MODEL RECOMMENDATIONS

(71) Applicant: MICROSOFT TECHNOLOGY LICENSING, LLC, Redmond, WA (US)

(72) Inventors: Vijay Mital, Kirkland, WA (US); Liang Du, Redmond, WA (US); Ranjith Narayanan, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 16/192,685

(22) Filed: Nov. 15, 2018

(65) Prior Publication Data

US 2020/0159856 A1    May 21, 2020

(51) Int. Cl.
    *G06F 16/33* (2019.01)
    *G06F 16/332* (2019.01)
    *G06F 16/9038* (2019.01)
    *G06F 16/31* (2019.01)
    *G06F 16/9032* (2019.01)

(52) U.S. Cl.
    CPC ........ *G06F 16/3338* (2019.01); *G06F 16/313* (2019.01); *G06F 16/3328* (2019.01); *G06F 16/9038* (2019.01); *G06F 16/90328* (2019.01)

(58) Field of Classification Search
    None
    See application file for complete search history.

(56) References Cited

U.S. PATENT DOCUMENTS

| | | | | |
|---|---|---|---|---|
| 7,953,730 B1 * | 5/2011 | Bleckner | ............. | G06F 16/951 |
| | | | | 715/733 |
| 8,788,517 B2 * | 7/2014 | Horvitz | ............. | G06F 16/951 |
| | | | | 707/759 |
| 9,239,883 B2 * | 1/2016 | Smyth | ............. | G06F 16/9535 |

(Continued)

FOREIGN PATENT DOCUMENTS

| | | |
|---|---|---|
| CA | 2747145 A1 | 1/2013 |
| EP | 2045742 A1 | 4/2009 |

OTHER PUBLICATIONS

"International Search Report and Written Opinion Issued in PCT Application No. PCT/US19/060169", dated Mar. 11, 2020, 12 Pages.

(Continued)

*Primary Examiner* — Grace Park
(74) *Attorney, Agent, or Firm* — Workman Nydegger (57) ABSTRACT

Expanding search engine functionality using AI models. A method includes, as part of a search session, receiving user input at a search engine. One or more searches on a set of data using the user input. Search results are provided from the one or more searches to a user. Based on a history of the search session, suggestions are provided in a user interface of AI models that could be applied to expand potential search results for the search session. User input is received at the user interface selecting one or more of the suggested AI model. The one or more selected AI models are applied to expand the set of data. Search results to the user based on searching the expanded set of data.

20 Claims, 3 Drawing Sheets

(56) References Cited

U.S. PATENT DOCUMENTS

| | | | | |
|---|---|---|---|---|
| 2006/0020962 A1* | 1/2006 | Stark | ............ | H04N 21/4131 |
| | | | | 725/135 |
| 2008/0104045 A1* | 5/2008 | Cohen | ............ | G06F 16/9535 |
| 2010/0281012 A1* | 11/2010 | Imig | ............ | G06F 16/951 |
| | | | | 707/708 |
| 2011/0208730 A1* | 8/2011 | Jiang | ............ | G06F 16/951 |
| | | | | 707/727 |
| 2011/0264678 A1* | 10/2011 | Mital | ............ | G06F 16/9535 |
| | | | | 707/759 |
| 2015/0088871 A1* | 3/2015 | Ruotsalo | ............ | G06F 16/9535 |
| | | | | 707/723 |
| 2017/0193362 A1* | 7/2017 | Cremer | ............ | G06F 16/61 |
| 2017/0220633 A1* | 8/2017 | Porath | ............ | G06F 9/542 |
| 2017/0242913 A1* | 8/2017 | Tijssen | ............ | G06F 40/247 |
| 2017/0243107 A1* | 8/2017 | Jolley | ............ | G06N 5/02 |
| 2017/0308613 A1* | 10/2017 | Zhu | ............ | G06F 16/9535 |
| 2018/0011854 A1* | 1/2018 | Yi | ............ | G06N 20/00 |
| 2019/0188295 A1* | 6/2019 | Sirotkovic | ............ | G06N 3/0445 |
| 2020/0117658 A1* | 4/2020 | Venkata | ............ | G06F 16/24534 |
| 2020/0159868 A1* | 5/2020 | Du | ............ | G06F 16/90328 |

OTHER PUBLICATIONS

"Office Action Issued in Indian Patent Application No. 202117021084", date Dec. 22, 2022, 7 Pages.

* cited by examiner

EXPANDING SEARCH ENGINE CAPABILITIES USING AI MODEL RECOMMENDATIONS

BACKGROUND

Background and Relevant Art

Modern computer technology has resulted in the proliferation of information. Indeed, vast amounts of information exist and continue to be generated at much greater rates than any other time in history. However, accessing particular portions of this information can be difficult. Attempting to find some particular piece of information is akin to finding the proverbial needle in a haystack.

Finding information has been facilitated by using search engines. Search engines index data allowing the data to be somewhat effectively searched. The search engines use the index to attempt to find certain data, retrieve the data, and return the data to a user searching for the data.

Different search engines have different indexing and searching algorithms which results in different search results being provided to users using different search engines. Additionally, traditional search engines have some limitations associated with indexing and/or searching algorithms used for the search engines. In particular, if an indexing algorithm is not configured to index certain types of data, data relationships, or other information, then that data cannot be discovered by searching that particular index, even though the data may be included in search results returned by a search engine. Thus, even though certain information exists or can be generated, that data will not be directly accessible using certain search engines.

Illustratively, while one may imagine when performing a search that there are endless search results by viewing the lengthy list displayed in the search engine browser interface and/or by viewing an estimated number of search results, the typical user recognizes quickly that there are a limited number of relevant search results that will be returned by most searches. However, even though the information desired by the user may be included in these results, the user may not be able to quickly identify the information in the results. Once these highly relevant search results have been identified, the user is left with a limited number of options. For example, the user can simply assume that the relevant search results identify the only relevant data and end their searching activities, and then try to manually comb and/or correlate information in the results to attempt to identify desired information and/or relationships. Alternatively, the user can attempt to craft new searches that attempt to uncover new information and/or relationships. However, this often requires a very sophisticated searcher and/or that the searcher perform additional related research to attempt to identify relevant search queries and/or relationships. In any case, current search engine technology provides a comparatively limited set of results and analysis of results compared to the results and analysis that could be provided from a given data set being searched. Thus, the user using a search engine user interface is only able to be presented with that limited set of results and information. To get a somewhat exhaustive set of search results, a user will need to interact with the search engine interface by inputting multiple different searches, inputting complex search combinations, manually performing complex or tedious analysis using limited information provided in a search engine user interface, or simply doing without the information. The use of multiple searches, complex search syntax, and limited analysis data presented in a search engine interface can be difficult, especially for novice users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for expanding search engine functionality using artificial intelligence (AI) models. The method includes, as part of a search session, receiving user input at a search engine. One or more searches on a set of data using the user input. Search results are provided from the one or more searches to a user. Based on a history of the search session, suggestions are provided in a user interface of AI models that could be applied to expand potential search results for the search session. User input is received at the user interface selecting one or more of the suggested AI model. The one or more selected AI models are applied to expand the set of data. Search results to the user based on searching the expanded set of data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein include a new and novel search engine user interface that allows a user to quickly expand search results during a search session. For example, in some embodiments, when a user has reached what appears to be the end of highly relevant results, and has still not identified information desired (or relationships for information in search results), the search engine user interface can provide suggested augmentation artificial intelligence (AI) models to the user that can be applied to the search session. In particular, the AI models can operate on certain data to produce additional augmentation data that can be refined, indexed, and searched to provide additional searchable data to the user that were not previously available.

Note that the AI models illustrated herein are generally augmentation AI models. An augmentation AI model takes as input certain data, and in particular, human consumable data. An augmentation AI model produces data that augments the input data according to a predetermined augmentation goal of the augmentation AI model. That is, the augmentation AI model attempts to produce a certain type augmentation data (as defined by the goal of the AI model) that is related to the input data, usually by providing additional data about individual pieces of input data or groups of pieces of data, where, at least a portion of that additional data was not previously included in the input data, but can be interpreted, rearranged, inferred, deduced, and/or speculated from the input data.

In some embodiments, the augmentation data is produced by aggregating aspects of several of the individual pieces of data in the input data to identify significant classifiable aspects, and then using those classifiable aspects to generate augmentation data for individual pieces of data and/or specific groups of individual pieces of data.

Certain semantics are preserved based on the goal of the AI model. These semantics can be used to search the generated augmentation data to identify augmentation data results, that can be used to identify data in the input data that correlates to the results from the search of the augmentation data.

Applying an AI model generates additional data about search results. This additional data can be filtered and semantically indexed for additional searching. In particular, an AI model is a model of a particular type and/or sub-type as defined by the goal of the AI model. The additional data generated by applying an AI model is semantically consistent with the goal of the AI model and is indexed where index keys (i.e., the terms and/or concepts to be searched in the index) are semantically indexed such that the index keys are directly related to the index type and/or sub-type. As the goal of the AI model in this particular example is style recognition, the additional data is semantically indexed for style recognition to allow the additional data to be searched for that purpose.

As discussed previously, augmentation AI models may be used with embodiments of the invention illustrated herein. Augmentation AI models produce additional data that augments input data as discussed above. The following illustrates a number of examples of augmentation AI models. Note that these different types of augmentation models may have some overlap and/or may be used together to accomplish some goal.

One type of augmentation AI model is classification models. Classification models have the goal of classifying data in input data. For example, a classification model could classify data as representing an animal, a person, a color, a style, or virtually any other classification.

Another type of augmentation AI model is detection models. Detection model have the goal of detecting certain characteristics in data. For example, an image recognition model may have a goal of detecting humans in images.

Another type of augmentation AI model is a scene recognition models. Scene recognition models have a goal of detecting specific instances in data. For example, while a detection model may detect a human generally, a scene recognition model may have a goal to detect a specific human.

Another type of augmentation AI model is localization models. Localization models have a goal of detecting details regarding time and space. For example, a localization model may have a goal of identifying a specific location or time that is relevant to data. For example, a localization model may be able to use features in a photograph to determine (within some probability and/or range) where and when the photograph was taken.

Another type of augmentation AI model is similarity/dissimilarity models. Similarity/dissimilarity models have the goal of identifying similarities and/or differences in different pieces of data. For example, a dissimilarity model may have a goal of determining when a particular individual is missing in a photograph, from among a set of photographs.

Another type of augmentation AI model is associative models. Associative models have the goal of identifying when different pieces of data are related. For example, an associative AI model may have the goal of determining what items typically occur together. Such a model could be used to identify when an item is missing.

Another type of augmentation AI model is prediction models. Prediction models have the goal of identifying data that might exist. For example, a prediction model may have a goal of determining what is likely to occur next in time based on a scene in a still photograph. Alternatively or additionally, a prediction model could have the goal of predicting what is behind an object in a still photograph.

Another type of augmentation AI model is summary models. Summary models have the goal of summarizing information from different pieces of data.

Another type of augmentation AI model is transformative models. Transformative models have the goal of changing data according to some predetermined characteristic. For example, a particular transformative model may have the goal of changing an image to a Van Gogh style painting, where Van Gogh style is the characteristic.

Embodiments illustrated herein implement an improved computing system that is able to expand search functionality by applying AI models to search results. In particular, when a user may reach what they think is a conclusion of a search session, due to lack of relevant search results and/or understanding search results, embodiments herein may increase the body of searchable data to allow for additional searching.

Figure 1:
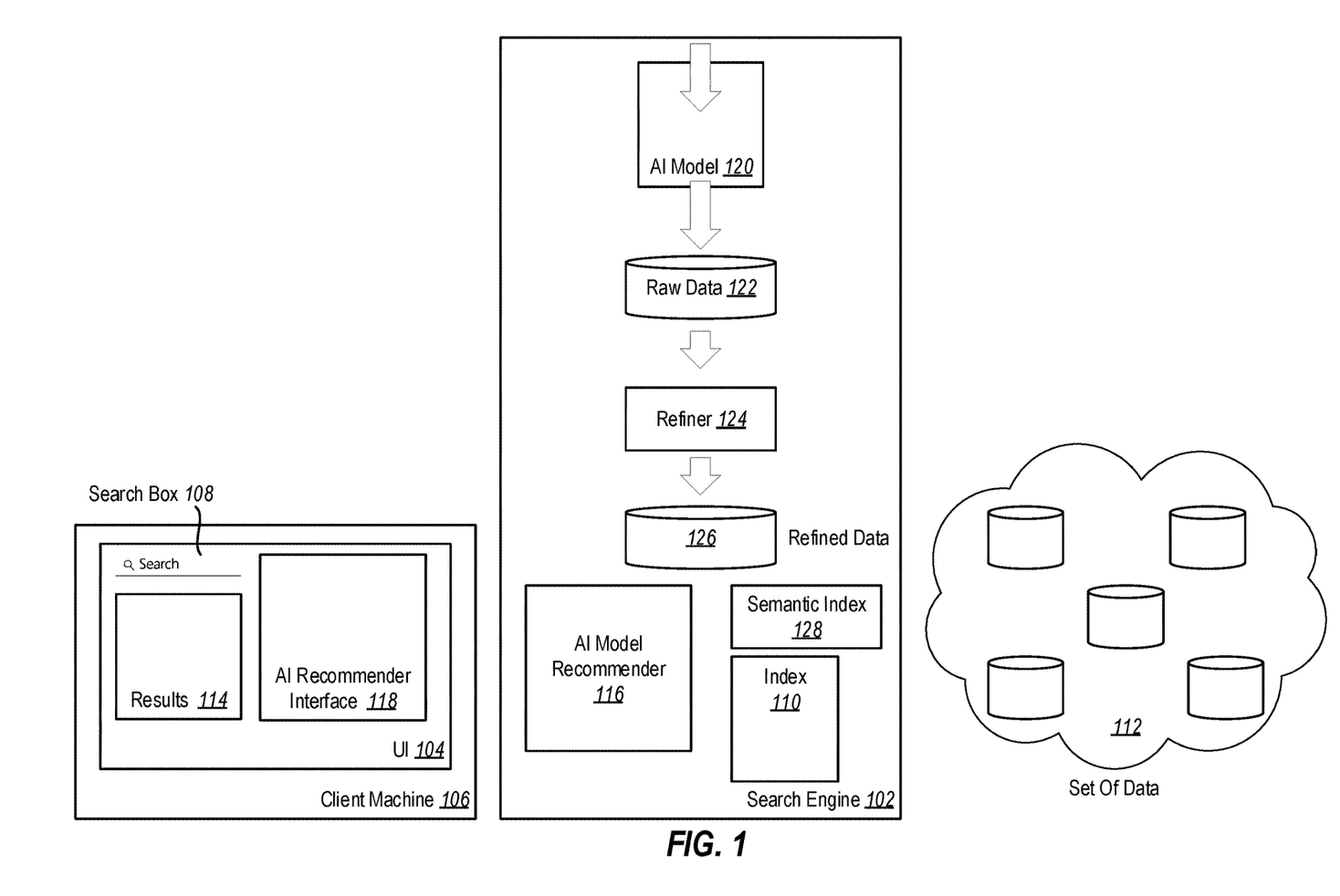
FIG. 1 illustrates a search engine and corresponding user interface for expanding search engine functionality by suggesting AI models to apply to data.

Referring now to FIG. 1 an example embodiment is illustrated. The embodiment illustrated in FIG. 1 shows a search engine 102. The search engine 102 includes computer hardware and software configured to perform searches on behalf of a client using a user interface 104. In particular, the user interface 104 is generally caused to be displayed by the search engine 102 at a client machine 106. Typically, the client machine 106 is at a remote location as compared to the search engine 102. Nonetheless, the search engine 102 renders the user interface 104 at the client machine 106 using various communications and algorithmic actions. A user at the client machine 106 can enter into a search box 108 various search terms. The search terms are provided to the search engine 102. The search engine 102 uses an index 110 to match search terms, operators (such as AND, XOR, OR, etc.), and/or filters (such as time filters, location filters, etc.) entered into the search box 108 to entries in the index 110.

The index 110 stores a correlation of index entries to endpoints storing data. In particular, the index 110 indexes a set of data 112. The set of data 112 may include a number of different data stores and data sets stored in many different locations. For example, many consumer-based search engines use an index which indexes data from a variety of sources and stored at data stores around the world. Thus, the set of data 112 can be nearly unlimited in its scope. The index 110 stores various keywords, or other information, correlated to endpoints where data is stored in the set of data 112. The index 110 will return results to the user interface 104 identifying the endpoints where a user can obtain the data relevant to the search terms entered into the search box 108. Often, the results include portions, or all, of the data from the endpoints.

At the user interface 104, the user can select various links provided by the index 110 to navigate to a data source endpoint having data of interest. In a typical scenario, the user will navigate the most relevant links to data sources fairly quickly. In some embodiments, the search engine 102 can document and store which links the user navigated to using the user interface 104. In an alternative or additional embodiment, the user can select various search results from the returned results 114 to indicate that those results are of interest even if the user does not select links to navigate to the endpoints for the links. For example, the user can mark results using check boxes, highlighting or other methods for indicating results of particular interest. Indeed, in some embodiments, the search results themselves may be the relevant results without need for navigating to a different data source. In some such embodiments, search results will not link to other data sources, but rather, are the relevant data. In alternative embodiments, the search results are the relevant data, but may nonetheless include links to related data or a data source where the relevant data can be found.

Once a user has visited or marked relevant search results from the returned results 114, during the same session, the user may perform additional searches by typing additional search terms in the search box 108 to view yet additional search results based on the additional searches. Throughout this process, the search engine 102 stores the search queries entered by the user at the client machine 106 into the user interface 104, results navigated to by the user from the return results 114, results indicated as being of interest by the user in the user interface 104, and/or additional search history, such as a user adding AI models to the search process, user actions with other computer hardware and/or software, etc.

Based on the users search history, the search engine 102 can recommend AI models to be used in searching. For example, the search engine 102 includes an AI model recommender 116 implemented using hardware and software at the search engine 102. The AI model recommender 116 is able to gather information, and using the gathered information, recommend AI models that might help the user to expand their search. For example, the AI model recommender 116 may gather information about searches requested by a user through the search box, search results navigated to by the user using the results 114, search results selected by the user as of particular interest, or even external information such as the user's emails, social media posts, text messages, etc. This information may be collected and stored in conjunction with search activities, a user's previous actions with other systems connected to the search engine, or in other appropriate ways. The AI model recommender 116 can use this information to identify available AI models that might be helpful to expand availability of search results to the user. The AI model recommender 116 will cause the search engine 102 to display an AI recommender interface element 118. The AI recommender interface element 118 displays to the user in the user interface 104 various AI models that may be of interest to the user. As noted previously, these recommendations are based on various historical elements associated with the search session and/or other historical elements. Thus, the recommended AI models are not simply a list of available models but rather a contextual list of AI models that may be of use to the user in expanding search results. Previously, the user would have needed to identify their own AI models based on the user's experience and knowledge and/or initiate additional searches without using additional AI models. Such actions would be particularly difficult for novice users not having access to the new and novel user interface illustrated herein.

The AI model recommender 116 may identify AI models in a number of different ways. For example, the AI recommender 116 may identify that the user is particularly interested in video-based results. In this case, the AI recommender 116 may suggest AI models that analyze video characteristics such as frame rates, resolutions, encoding, styles, etc. Alternatively or additionally, if the AI recommender 116 identifies that the user is particularly interested in results having to do with literature, the AI recommender 116 may suggest AI models that analyze results for literary style, genre, target audience, etc. Thus, in some embodiments, the AI recommender 116 is able to identify AI models that are particularly relevant to the types of search results that the user has navigated to and/or has indicated are of particular relevance.

The AI recommender 116 may itself be modified using AI. For example, the AI recommender 116 may become more advanced by identifying which recommended AI models the user selects. Alternatively, or additionally, the AI recommender 116 may be implemented in a collaborative fashion that allows knowledge regarding users, types of users, and other information to be collected across multiple different users and platforms to refine the ability of the AI recommender 116 to recommend AI models that are of interest to particular users.

Once the user selects one of the recommended models from the AI recommender interface element 118, the AI model 120 is instantiated. The AI model 120 takes as input any relevant data. In some embodiments, such data may be data identified by the user from the results 114. For example, the inputs to the AI model 120 may be data identified by search result links navigated to by the user, search results selected by the user as particularly relevant, and/or associated data.

The AI model 120 operates on the various input to create raw data 122. The raw data 122 is passed through a refiner 124 to produce refined data 126. The refined data 126 can be indexed to create a semantic index 128. The semantic index 128 is able to be searched by the search engine 102. This allows for additional results to be returned in the results interface 114 of the user interface 104. The returned results may be data in the refined data 126, or alternatively may be data from the set of data 112 correlated to the returned results. Thus, for example, the refined data 126 may identify data in the set of data 112, or data in previously returned results, having styles. If a new search is for a particular style, data from the set of data 112 or from previous search results can be identified as having the particular style, such that the data from the set of data 112 or data from previous search results can be returned as results of searching the refined data (which correlates to the set of data 112, search result data, or other data).

In this way, available results are extended by the search engine 102 by identifying AI models that can be implemented to increase the available data (including data relationships) that can be searched by the search engine 102. In some embodiments, the refined data 126 is added to the set of data 112, and the index 110 is expanded to include the semantic index 108 allowing the search engine 102 search across both existing data, as well as data created by applying AI models.

As noted above, when input datasets are operated on by AI models, raw data is produced. The raw data includes a large amount of produced data, much of which will not typically be of interest to a user. Thus, some embodiments may refine the raw data into a refined data structure. In some embodiments, a refiner computing entity, such as the refiner 124 discussed above, may be used to perform this functionality. The refinement may involve the refiner 124 truncating, converting, combining, and/or otherwise transforming portions of the AI model output. The refinement may involve the refiner 124 prioritizing portions of the output by perhaps ordering or ranking the output, tagging portions of the AI model output, and so forth. There may be a different refinement specified for each AI model or model type. There may even be a different refinement specified for each model/data combination including an AI model or model type with an associated input dataset or input dataset type. Upon obtaining output data from the AI model, the appropriate refinement may then be applied. The refinement may cause the refiner to bring forth, for instance, what a typical user would find most relevant from a given AI model applied on given data. The actually performed refinement may be augmented or modified by hints specific to an AI model and/or by learned data.

As an illustrative example, certain types of AI models are typically used to try and produce certain types of data. Thus, data that is produced in the raw output data that is not of the type typically evaluated when using a particular AI model may be removed to create refined data.

In some embodiments, the refined data may then be semantically indexed to provide a semantic index (such as semantic index 128) that may then be queried upon by a user. Semantic indexing, and the corresponding retrieval methods used by the search engine 102, are directed to identifying patterns and relationships in data. For example, some embodiments implementing semantic indexing can identify relationships between terms and concepts that are present in otherwise unstructured data. Thus, a semantic indexer may be able to take a set of unstructured data and identify various latent relationships between data elements in the unstructured data. In this way, a semantic indexer can identify expressions of similar concepts even though those expressions may use different language to express the same concepts. This allows data to be indexed semantically as opposed to merely indexing data based on element wise similarity.

A characterization structure might also include a set of one or more operators and/or terms that a query engine may use to query the semantic index. By providing those operators and/or terms to a query engine, such as the search engine 102, the user may more effectively use that query engine to extract desired information from the semantic index.

The characterization structure might also include a set of one or more visualizations that a visualization engine may use to visualize, to a user, responses to queries against the semantic index. Such visualizations may be those that for the given semantic index, most effectively and intuitively represent the output of a query to a user. Thus, the characterization structure may also provide mechanisms to effectively interface with a semantic index generated from the refined output of the AI model. The characterization structure may be easily expanded as new AI model and/or dataset types become available.

The refinement may also be based on hints associated with that AI model, and/or learned behavior regarding how that AI model is typically used. The obtained results are then refined using the determined refinement. It is then this more relevant refined results that are semantically indexed to generate the semantic index 128.

In some embodiments, feedback is provided to the user is based on new semantics added into a semantic space. In particular, the search engine 102, which is a computer implemented processor that includes data processors and data analyzers, along with a graphical user interface, is able to identify what words are added to a new or existing semantic space. These may have been added as the result of the user adding new data sources to the search engine 102 and/or the result of adding new AI models to a search or search session.

Note that while a specific user interface is illustrated, it should be appreciated that other types of interfaces could be used. For example, in some embodiments, an e-commerce website may be part of the user interface of a search engine.

Some embodiments may include a research button. When a user selects the research button, a user interface can identify appropriate UI models and suggest them to a user. For example, based on the data selected by a user, the search engine 102 could suggest modes for summarizing data, finding similar sets of data, etc. Alternatively, the user could indicate a desire to summarize data, find similar data, etc., exclusive of being presented with a suggested AI models for these actions. The user selecting one of these choices would cause appropriate AI models to be identified and suggested to the user. For example, if the user chose 'summary' then additional AI models could be identified, such as clustering models, decision tree models, etc.

Some embodiments may identify and suggest useful AI models, and then identify and suggest additional models based on models applied in a successive manner, Some embodiments may be useful in e-commerce shopping user interfaces. For example, style models may be suggested to a user. For example, a user could select an item for purchase, and the user could be presented with the ability to select different AI models related to the style of the selected item. When the user selects the particular style, an AI model could be used to find other items that have a similar style. In this way, a user could identify pieces that would coordinate with a selected item. This could allow a user to be their own interior designer. Note, that such models may be based on an art genre, branded models, celebrity endorsed models, etc. The models do not necessarily include objects produced by the branded company, celebrity, etc., but rather would be the types of products that the branded company, designer, celebrity, etc. might endorse or use.

Figure 2:
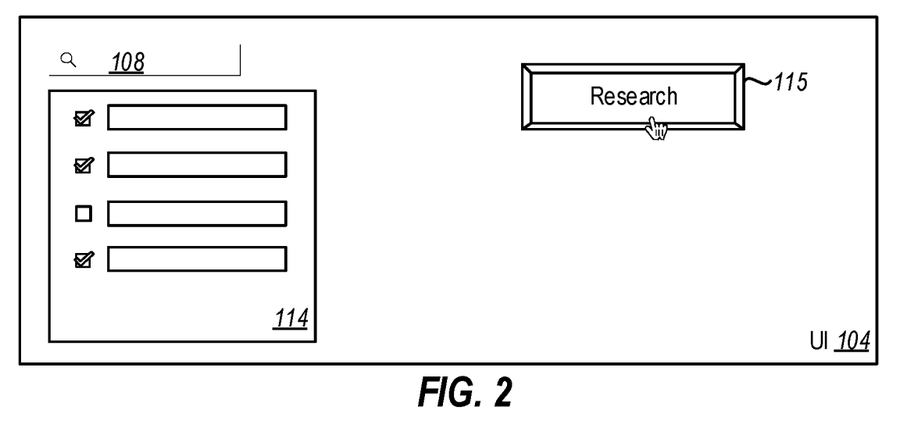
FIG. 2 illustrates a user interface allowing a user to request suggestions for AI models.
Figure 3:
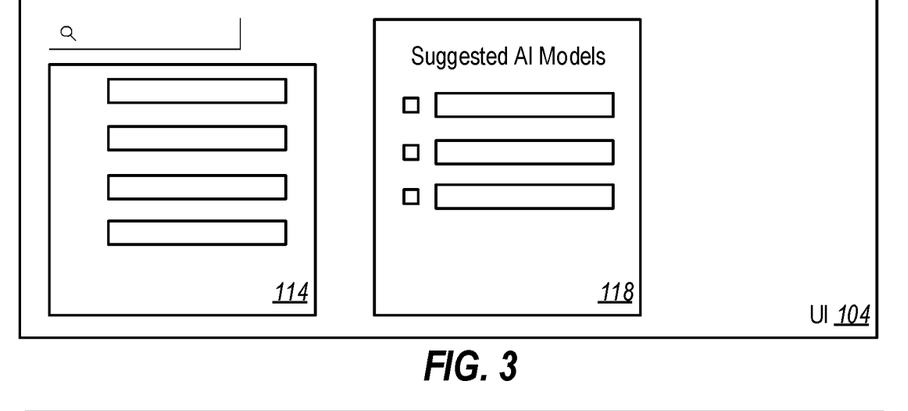
FIG. 3 illustrates a user interface allowing a user to select AI models.

Referring now to FIG. 2, example user interface elements are illustrated. FIG. 2 illustrates that the user interface 104 includes a research button 115. The research button 115 causes the search engine to display in the user interface 104 suggested AI models as illustrated in FIG. 3 which shows the AI recommender interface element 118. As described above, the suggested AI models illustrated in the AI recommender interface element 118 may be based on search results selected by the user, previous searches performed by the user, or other information.

Figure 4:
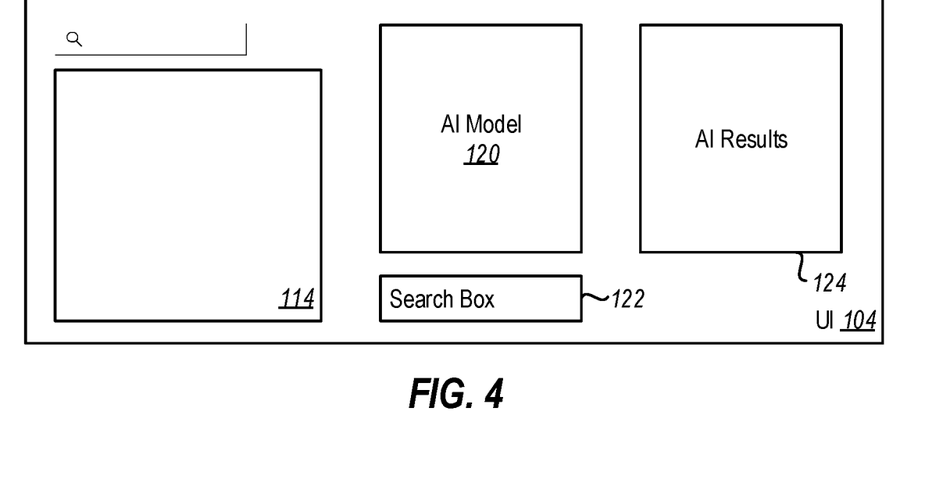
FIG. 4 illustrates a user interface showing additional results based on searching data generated by applying AI models.

As a result of selecting a suggested AI model from the AI recommender interface element 118, an AI model 120 is added to the search session as illustrated in FIG. 4. A user can enter a search in the search box 122 which causes the search engine 102 to search the semantic index 128 to search the additional data generated from the AI model 120. Note that the search in the search box 122 will not necessarily cause results to return that include the data generated by the AI model 120 (although such data could be returned, in some embodiments), but rather may use a reference back to original results in the results 114 to return results from the original results 114. These are displayed in the AI results 124. In particular, the AI model 120, in some embodiments, will generate data that is related to the data in the search results 114. For example, the AI model 120 may identify various characteristics of data in the search results 114. When the search engine searches data generated by the AI model 120, that data may have relationships to the search results 114. Thus, the AI results 124 may include data from, or associated with the search results 114 even though the search performed by the search engine is on the data produced by the AI model 120.

Note that while in the above example the user selected a research button 115 to obtain suggested AI models in the AI recommender interface element 118, in other embodiments, the search engine may automatically display suggested AI models to the user in the user interface 104. For example, the search engine may determine that the user is frustrated in their searching in a search session. The search engine may determine that a user is frustrated in their searching by determining that the user has performed a predetermined number of searches without selecting any search results. Alternatively, or additionally, the search engine may determine that the user is frustrated in their search results in their searching when the number of search results displayed are below a predetermined threshold number of search results.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
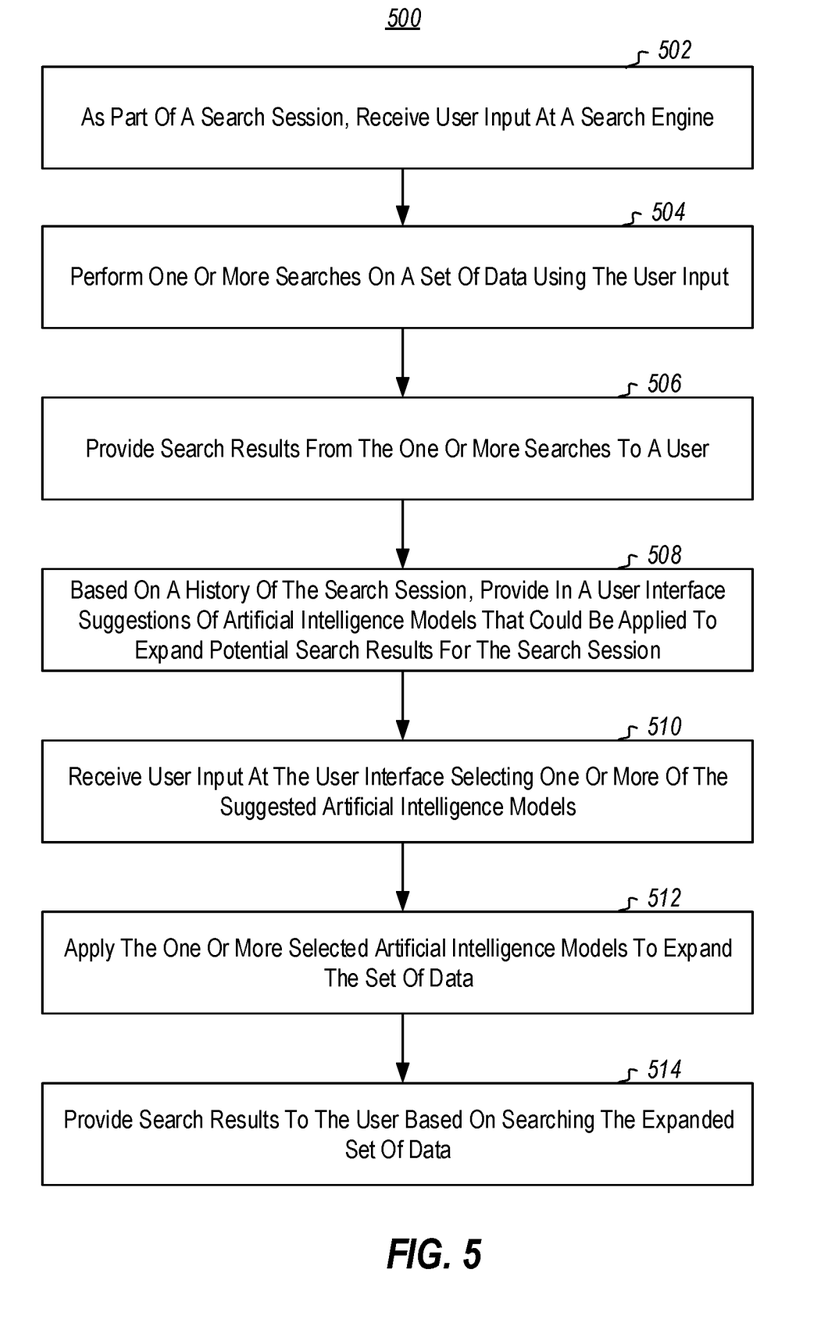
FIG. 5 illustrates a method of expanding search engine functionality using AI models.

Referring now to FIG. 5, a method 500 is illustrated.

The method may be practiced in a computing environment, and includes acts for expanding search engine functionality using AI models.

The method 500 includes, as part of a search session, receiving user input at a search engine (act 502). For example, a user may enter search terms in the search box 108 illustrated above.

The method 500 further includes performing one or more searches on a set of data using the user input (act 504). For example, as illustrated above, the search engine 102 may perform searches using the index 110 on the set of data 112.

The method 500 further includes providing search results from the one or more searches to a user (act 506). For example, as illustrated above, the return results 114 may be provided to a user.

The method 500 further includes, based on a history of the search session, providing in a user interface suggestions of AI models that could be applied to expand potential search results for the search session (act 508). For example, as illustrated in FIG. 3 above, suggested AI models may be provided in an AI recommender interface 118 of the user interface 104.

The method 500 further includes receiving user input at the user interface selecting one or more of the suggested AI models (act 510). For example, as illustrated above, the user may select one or more AI models to be applied to data, such as selected search results or other appropriate data.

The method 500 further includes applying the one or more selected AI models to expand the set of data (act 512). For example, as illustrated above in FIG. 1, an AI model 120 may be applied to data to create additional data such as defined data 126.

The method 500 further includes providing search results to the user from the expanded set of data (act 514). As noted above, these results are often not directly from the new data, but may identify previous data using the new data.

The method 500 may be practiced where the history of the search session includes a history of previous searches by a user.

The method 500 may be practiced where the history of the search session includes a history of previous AI models selected by a user. This could include information about an order in which models were applied, information that models that were later removed, etc.

The method 500 may be practiced where the history of the search session includes identification of a set of search results that the user has identified as being particularly relevant.

The method 500 may be practiced where applying the one or more selected AI models causes additional search data to be added to a search index.

The method 500 may be practiced where applying the one or more selected AI models causes additional raw data to be added to the set of data.

The method 500 may be practiced where applying the one or more selected AI models causes additional refined data to be created for the set of data.

The method 500 may be practiced where applying the one or more selected AI models causes the set of data to be expanded to creating one or more summaries of data from the set of data. The summaries could be based on collecting data by automatically following links to data, collecting data from selected data sets, etc.

The method 500 may further include determining that search results from the one or more searches have fallen below a predetermined threshold. For example, a determination may be made that the results have fallen below a number of results. Alternatively, a determination may be made that results have fallen below a particular relevance measurement. Or that that results have fallen below a particular number with a certain relevance measurement. Alternatively, a determination may be made that results have fallen below a predetermined quality measurement. For example, results may be coming from sources that are known to produce low quality (e.g., accuracy) data. In some such embodiments, providing in a user interface suggestions of AI models that could be applied to expand potential search results for the search session is performed as a result of identifying that data has fallen below the threshold. Thus, no direct user interaction is required to cause the suggested AI models to be presented to the user.

The method 500 may further include, displaying a user interface element in the user interface that when selected causes providing in the user interface suggestions of AI models that could be applied to expand potential search results for the search session is performed as a result. For example, as illustrated above, the research button may be provided to a user to allow the user to cause suggested AI models to be displayed.

The method 500 may further include using history from other applications and hardware to determine suggested AI models. For example, on line storage accounts, social media activity, emails, etc., may be used to determine topics that are of current interest to a user. This may be used to determine AI models that are particularly relevant to a user performing searches, as the searches may be relevant to other activities performed by the user on other platforms.

The method 500 may further include, determining user frustration and as a result recommending AI models. For example, user frustration can be identified by identifying that a user is not clicking on results for a predetermined number of searches. Alternatively or additionally, user frustration may be identified by determining that a number of results is below a pre-determined threshold for a pre-determined number of searches. In some embodiments, the threshold could be dynamic, such as a diminishing threshold number as the number of searches performed in a search session increases.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for expanding a set of data that a search engine searches, where said expansion is performed using one or more artificial intelligence (AI) models, the method comprising:
    as part of a search session, receiving user input at a search engine;
    performing one or more searches on a set of data using the user input;
    providing search results from the one or more searches to a user;
    providing, in a user interface, a list of one or more AI models, wherein the one or more AI models are configured to operate on the search results and to cause additional searchable data to be generated, wherein the additional searchable data (i) is related to the user input and (ii) was not previously included in the search results, and wherein the additional searchable data, when generated, is added to the set of data such that the set of data is expanded, and wherein the list of one or more AI models is provided in the user interface based on a determined user attribute of the user;
    receiving a user selection of a particular AI model included among the one or more AI models, wherein the particular AI model is applied to the search results, and the additional searchable data is subsequently generated, and wherein the additional searchable data is then added to the set of data such that the set of data is now expanded data;
    causing the search engine to conduct a subsequent search on the expanded data such that the subsequent search is performed on a combination of existing data originally included in the set of data and newly created data generated by the particular AI model; and
    returning a result from the subsequent search to the user.

2. The method of claim 1, wherein a history of the search session includes a history of previous searches by the user.

3. The method of claim 1, wherein a history of the search session includes a history of previous AI models selected by the user.

4. The method of claim 1, wherein a history of the search session includes a set of search results that the user has identified as being particularly relevant.

5. The method of claim 1, wherein the additional searchable data is added to a search index.

6. The method of claim 1, wherein applying the particular AI model to the search results causes raw data to be generated, and wherein the raw data is subsequently refined to generate refined data.

7. The method of claim 6, wherein the refined data is indexed to create a semantic index.

8. The method of claim 7, wherein the semantic index is searched by the search engine.

9. The method of claim 1, wherein the method further comprises:
    displaying a user interface element in the user interface, wherein the user interface element, when selected, provides the list of one or more AI models.

10. The method of claim 1, wherein the method further comprises using history from other applications and hardware to determine the one or more AI models that are included in the list.

11. The method of claim 1, wherein the user attribute is a determined user frustration, and wherein the list of one or more AI models is provided based on the determined user frustration.

12. The method of claim 11, wherein determining the user frustration comprises determining that the user is not clicking on results for a predetermined number of searches.

13. The method of claim 11, wherein determining the user frustration comprises determining that a number of results is below a pre-determined threshold for a pre-determined number of searches.

14. A computer system that expands a set of data that a search engine searches, where said expansion is performed using one or more artificial intelligence (AI) models, said computer system comprising:
    one or more processors; and
    one or more computer-readable media having stored thereon instructions that are executable by the one or more processors to cause the computer system to:
        as part of a search session, receive user input at a search engine;
        perform one or more searches on a set of data using the user input;
        provide search results from the one or more searches to a user;
        provide, in a user interface, a list of one or more AI models, wherein the one or more AI models are configured to operate on the search results and to cause additional searchable data to be generated, wherein the additional searchable data (i) is related to the user input and (ii) was not previously included in the search results, and wherein the additional searchable data, when generated, is added to the set of data such that the set of data is expanded, and wherein the list of one or more AI models is provided in the user interface based on a determined user attribute of the user;
        receive a user selection of a particular AI model included among the one or more AI models, wherein the particular AI model is applied to the search results, and the additional searchable data is subsequently generated, and wherein the additional searchable data is then added to the set of data such that the set of data is now expanded data;
        cause the search engine to conduct a subsequent search on the expanded data such that the subsequent search is performed on a combination of existing data originally included in the set of data and newly created data generated by the particular AI model; and
        return a result from the subsequent search to the user.

15. The computer system of claim 14, wherein applying the particular AI model to the search results causes raw data to be generated, and wherein the raw data is subsequently refined to generate refined data.

16. The computer system of claim 15, wherein the refined data is indexed to create a semantic index.

17. The computer system of claim 14, wherein the user interface includes a user interface element that, when selected, causes the list of one or more AI models to be displayed.

18. The computer system of claim 14, wherein at least some of the additional searchable data is displayed proximately to the search results in the user interface.

19. A method for expanding a set of data that a search engine searches, where said expansion is performed using one or more artificial intelligence (AI) models, the method comprising:

in response to receiving user input within a first search box in a user interface, causing a search engine to perform a search on a set of data using the user input;

providing search results from the search to a user;

providing, in the user interface, a list of one or more AI models, wherein the one or more AI models are configured to operate on the search results and to cause additional searchable data to be generated, wherein the additional searchable data (i) is related to the user input and (ii) was not previously included in the search results, and wherein the additional searchable data, when generated, is added to the set of data such that the set of data is expanded, and wherein the list of one or more AI models is provided in the user interface based on a determined user attribute of the user;

receiving a user selection of a particular AI model included among the one or more AI models, wherein the particular AI model is applied to the search results, and the additional searchable data is subsequently generated, and wherein the additional searchable data is then added to the set of data such that the set of data is now expanded data;

displaying a second search box in the user interface;

in response to one or more search terms being entered in the second search box, causing the search engine to conduct a subsequent search on the expanded data such that the subsequent search is performed on a combination of existing data originally included in the set of data and newly created data generated by the particular AI model; and returning a result from the subsequent search to the user.

20. The method of claim 19, wherein the user attribute is a determined user frustration.

* * * * *